Figure 1:
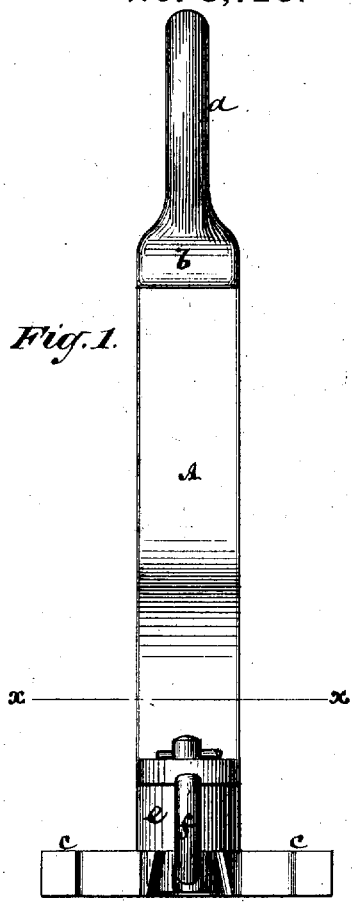

H. & H. W. LOVEJOY, J. H. FERGUSON,
& M. J. CREEGAN.
Apparatus for Electro-Plating No. 8,726. Reissued May 27, 1879.

Inventors
Henry Lovejoy
Henry W. Lovejoy
James H. Ferguson
Michael J. Creegan
by their Attorneys
Brown & Brown Witnesses
John Becker
Fred K. Haynes

UNITED STATES PATENT OFFICE.

HENRY LOVEJOY, HENRY W. LOVEJOY, AND JAMES H. FERGUSON, OF BROOKLYN, AND MICHAEL J. CREEGAN, OF NEW YORK, N. Y.

IMPROVEMENT IN APPARATUS FOR ELECTROPLATING.

Specification forming part of Letters Patent No. 151,892, dated June 9, 1874; Reissue No. 8,726, dated May 27, 1879; application filed May 1, 1879.

*To all whom it may concern:*

Be it known that we, HENRY LOVEJOY, HENRY W. LOVEJOY, and JAMES H. FERGUSON, all of Brooklyn, in the county of Kings and State of New York, and MICHAEL J. CREEGAN, of the city and State of New York, have invented certain Improvements in Apparatus for Electroplating, of which the following is a description.

Our invention relates to devices for suspending electrotype-molds and forming electric connection therewith in the decomposing-trough of a battery.

Heretofore it has been customary to suspend the mold to be coated with metal by wires or hooks hanging on a rod placed across the top of the trough, the rod being in electric connection with the battery, and, in some cases, the wires or hooks making the connection between the mold and the rod. This method makes a sure connection, but requires that all metallic surfaces where deposit is not required shall be insulated by some non-conducting substance.

In another method sometimes practiced, the rod from which the mold is suspended is not in the circuit; but there is an additional rod which is in the circuit, from which the connection with the mold is made by wires or thin strips of metal. This method is less convenient and expeditious so far as hanging the molds in the bath is concerned, but saves time in preparing the mold, and as the mold-case is not in the circuit, there is no liability of copper being deposited on it.

A third and less convenient method is to clamp the case to a wooden frame and suspend the whole by hooks, the electric connection being effected by wires embedded in the wood.

Our invention not merely obviates the necessity of covering the cases with a non-conducting substance for the purpose of insulating them, and makes the electric connection certain with as little trouble as by any of the methods hereinbefore referred to, but possesses other important advantages, as will be hereinafter described.

It consists in a hanger having at its lower end both a hook for suspending the electrotype mold-case and a bearer or bearers to bear against the face of the mold, and having at its upper end a hook for suspending it from the rod over the trough or bath, the said bearer or bearers being in metallic connection with the hook at the upper end, and the said hook at the lower end being insulated from that at the upper end and from the bearers.

The invention also consists in a hanger provided with a lower hook for suspension of the mold-case, and constructed with divided bearing-arms or bearers for the mold on opposite sides of said hook, whereby a more certain electric connection is insured between the hanger and the mold, and the case is steadied in its proper position.

Furthermore, the invention consists in a special simple and effective construction of the hanger, which comprises a metallic bar provided with a hook for hanging it on the rod over the decomposing-trough, the lower end of said bar being divided and extending laterally, so as to form two arms to bear against the mold, and a socket arranged between said arms for the reception of insulating substance, through which passes a hook for suspending the case.

The invention likewise consists in a hanger-bar provided with a hook at its lower end for suspension of the mold-case, and having its upper end or portion constructed to form both a hook for suspending it and an eye or ring to facilitate the handling of the hanger.

Figure 2:
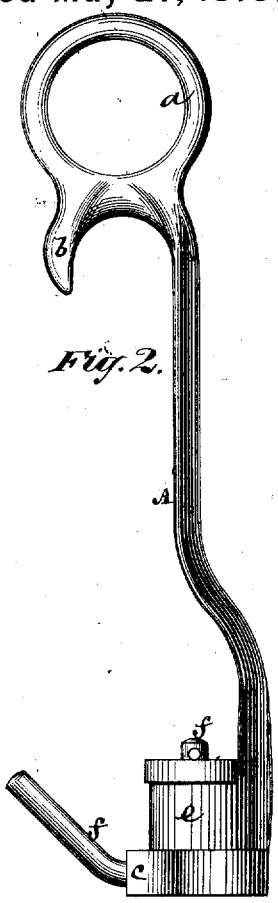
Figure 3:
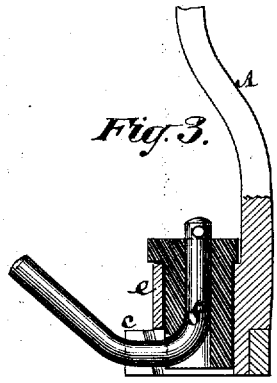
Figure 4:
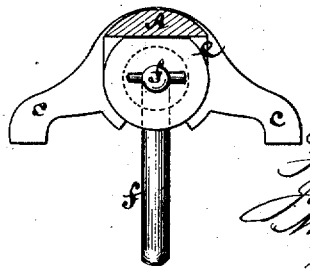

In the accompanying drawings, Figure 1 represents a front view of a hanger for a mold or mold-case constructed in accordance with our invention; Fig. 2, a side view of the same; Fig. 3, a longitudinal section of the lower portion of said hanger, and Fig. 4 a transverse section on the line *x x* in Fig. 1.

A is a metallic bar, having a ring, *a*, at its upper end to facilitate handling the hanger, of which said bar forms a component part. Immediately below said ring is a hook, *b*, for suspending the hanger upon the rod, which is arranged over the decomposing trough or bath. The lower end of the bar A is bifurcated or constructed so as to form two arms, *c c*, which extend laterally for any desired distance on both sides of the bar, and terminate in forwardly-projecting ends, which make the arms *c* form separated bearers for the mold. Between said arms or bearers, at the lower end of the bar, is a socket, *e*, which is filled with rubber, or other suitable insulating substance, and through which passes a hook, *f*, for holding the case or frame which carries the mold to be coated.

The mold case or frame is suspended from the hook *f*, and the hanger is suspended by hanging the hook *b* on the rod over the trough, at such a distance above the surface of the bath as to prevent the immersion of the hanger in the bath, but allow the mold to be completely immersed. A strip of copper is placed on the face of the mold under or against each of the bearers *c*, each strip being long enough to reach below the surface of the bath, and thus complete the circuit from the hanger to the coated surface of the mold. The lower portion of the bar is so bent or constructed as to bring the bearers *c* vertically under the hook *b*, whereby the mold is made to hang in the proper position in the bath.

A hanger constructed as described may be made almost entirely of metal, and free from screws or parts liable to become detached or work loose, is cheaply made, strong and durable, and serves to establish the necessary insulation of the mold-case from the hanger, but retains the electric communication of the hanger with the face of the mold.

It is preferred to establish the electric communication between the hanger and the mold by dividing the hanger to form two arms, bearing against the mold or intervening strip of metal on opposite sides of the lower hook, as hereinbefore described, inasmuch as the separated bearers or bearing portions of the arms not only serve to steady the case, but to insure greater certainty as regards the electric communication between the hanger and the mold, as should one bearer become defective there is but little probability of the other bearing being so at the same time.

We claim—

1. The hanger having at its lower end both a hook for suspending the electrotype mold-case and a bearer or bearers to bear against the face of the mold, and having at its upper end a hook for suspending it from the rod over the trough or bath, the said bearer or bearers being in metall c connection with the hook at the upper end, and the said hook at the lower end being insulated from that at the upper end and from the bearers, substantially as specified.

2. The hanger provided with a lower hook for suspension of the mold-case, and constructed with divided bearing-arms or bearers for the mold on opposite sides of said hook, essentially as and for the purposes herein set forth.

3. The hanger consisting of the bar A, the arms or bearers *c c*, the socket *e*, the insulator, *d*, and the hook *f*, combined substantially as shown and described.

4. The bar A of the hanger provided with a hook, *f*, at its lower end, and having its upper end or portion constructed to form both a hook, *b*, for suspending it, and an eye or ring, *a*, to facilitate the handling of the hanger, essentially as shown and described.

HENRY LOVEJOY.
HENRY W. LOVEJOY.
JAMES H. FERGUSON.
MICHAEL J. CREEGAN.

Witnesses:
WILLIAM RIKER,
EDWD. E. WELLS.